(12) United States Patent
Kieserling et al.

(10) Patent No.: US 6,394,493 B1
(45) Date of Patent: May 28, 2002

(54) STEERING ARRANGEMENT FOR A MOTOR VEHICLE

(75) Inventors: Joachim Kieserling, Kernen; Gregor Orbach, Holzgerlingen; Gottfried Schremmer, Tamm, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/617,873

(22) Filed: Jul. 17, 2000

(30) Foreign Application Priority Data

Jul. 17, 1999 (DE) .......................... 199 33 676

(51) Int. Cl.$^7$ .............................................. B62D 1/187
(52) U.S. Cl. ......................... 280/775; 280/779; 74/493
(58) Field of Search ................................ 280/775, 779; 74/493

(56) References Cited

U.S. PATENT DOCUMENTS

| | | | | |
|---|---|---|---|---|
| 4,657,281 A | * | 4/1987 | Haldric et al. ............... | 280/775 |
| 5,199,319 A | * | 4/1993 | Fujiu ........................... | 74/493 |
| 5,294,149 A | * | 3/1994 | Haldric et al. ............... | 280/775 |
| 5,306,032 A | * | 4/1994 | Hoblingre et al. .......... | 280/775 |
| 5,481,937 A | * | 1/1996 | Uphaus et al. .............. | 74/493 |
| 5,520,416 A | * | 5/1996 | Singer, III et al. .......... | 280/775 |
| 5,711,189 A | * | 1/1998 | Cartwright et al. .......... | 74/493 |
| 5,730,465 A | * | 3/1998 | Barton et al. ................ | 280/775 |
| 5,806,890 A | * | 9/1998 | Sugiki et al. ................ | 280/775 |
| 5,813,699 A | * | 9/1998 | Donner et al. .............. | 280/775 |
| 5,988,679 A | * | 11/1999 | Schelling et al. ........... | 280/775 |
| 6,039,350 A | * | 3/2000 | Patzelt et al. ................ | 280/775 |

FOREIGN PATENT DOCUMENTS

| | | |
|---|---|---|
| DE | 3923982 | 2/1991 |
| DE | 19512809 | 10/1995 |
| EP | 0800978 | 10/1997 |

* cited by examiner

Primary Examiner—Brian L. Johnson
Assistant Examiner—Deanna Draper
(74) Attorney, Agent, or Firm—Crowell & Moring LLP

(57) ABSTRACT

A steering arrangement for a motor vehicle has a steering column tube which is arranged in a steering-wheel-side area in a height-adjustable manner relative to a vehicle-fixed console by way of an adjusting device. In a steering-gear-side area, the steering column tube is swivellably disposed on the vehicle-fixed console by way of a compensating bearing. The steering column tube is additionally held longitudinally adjustably by the adjusting device, and the compensating bearing is formed by a single suspension point which is eccentrically applied to the steering column tube and which defines the swivelling axis for the height adjustment of the steering column tube, and which, in the longitudinal direction of the steering column tube, has degrees of freedom for a displaceability of the steering column tube.

14 Claims, 2 Drawing Sheets

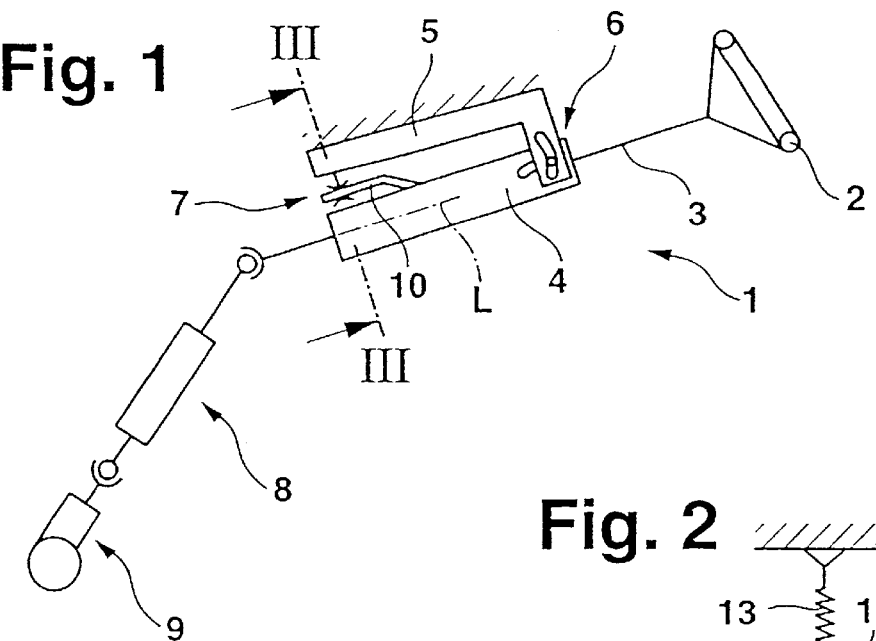
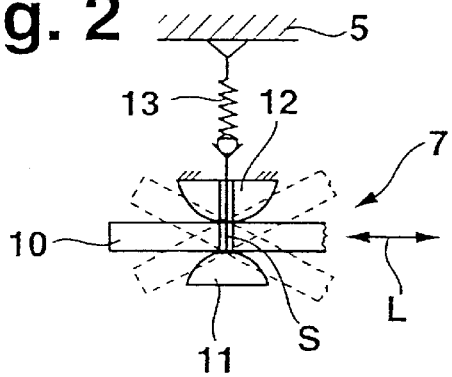
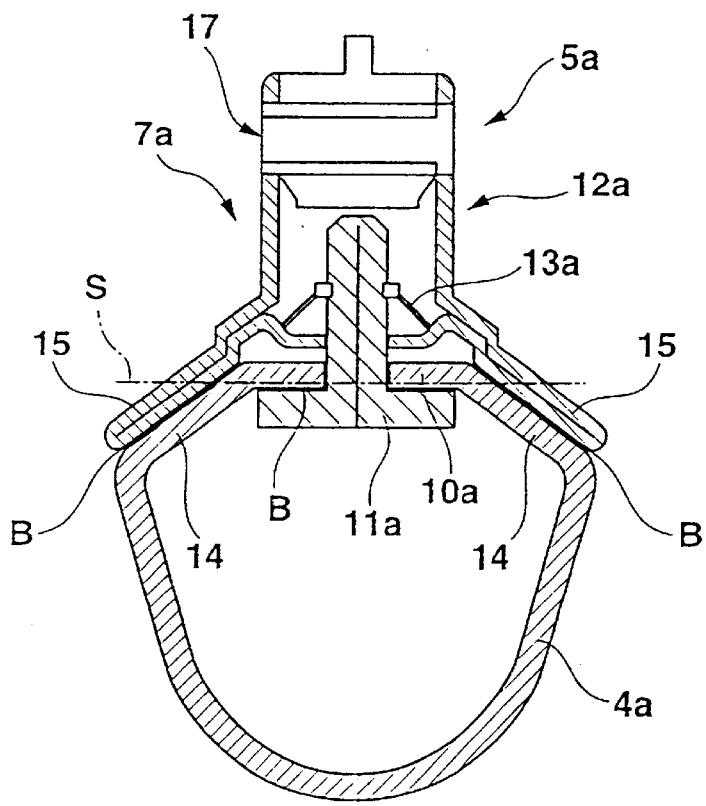

STEERING ARRANGEMENT FOR A MOTOR VEHICLE

BACKGROUND AND SUMMARY OF INVENTION

This application claims the priority of German patent document 199 33 676.4, filed Jul. 17, 1999, the disclosure of which is expressly incorporated by reference herein.

The invention relates to a steering arrangement for a motor vehicle having a steering column tube which is arranged in a steering-wheel-side area, for a height adjustment of the steering wheel, in a height-adjustable manner relative to a vehicle-fixed console by means of an adjusting device, and which, in a steering-gear-side area, is swivellably disposed on the vehicle-fixed console by means of a compensating bearing.

Such a steering arrangement for a motor vehicle is known from German Patent Document DE 195 12 809 A1. In order to achieve a height adjustment of a steering wheel of the steering arrangement, a steering column tube of the steering arrangement is held in a steering-wheel side and thus—relative to the normal driving direction—rear area so that it can be vertically displaced by means of a manual adjusting device. On the front side and thus facing a steering gear of the steering arrangement, the steering column tube is held on a vehicle-fixed console by means of a compensating bearing. The compensating bearing has a ring which reaches around the steering column tube and which, viewed radially, has an elastically flexible design and is positioned inside a ring flange fixedly screwed to the vehicle. This front-side area forms the swivel bearing of the steering column tube in order to be able to achieve the height adjustment of the steering column tube by means of the rear-side adjusting device.

It is an object of the invention to provide a steering arrangement of the initially mentioned type which permits by means of simple devices a height adjustment as well as a longitudinal adjustment of a steering wheel of the steering arrangement.

This object is achieved in that the steering column tube is additionally longitudinally adjustably held by means of the adjusting device, and in that the compensating bearing is formed by a single suspension point eccentrically applied to the steering column tube, which suspension point defines the swivelling axis for the height adjustment of the steering column tube and which, in the longitudinal direction of the steering column tube, has degrees of freedom for a displaceability of the steering column tube. As a result, in addition to a height adjustability of the steering wheel, a longitudinal adjustability is achieved in a simple manner. The compensating bearing has an extreme simple and compact construction. By means of the eccentric arrangement of only one suspension point, which is situated above a steering spindle disposed on the steering column tube, an extremely simple holding device of the steering column tube is achieved which requires only little space. The longitudinal mobility of the steering column tube in the area of the suspension point by means of the degrees of freedom is preferably adapted to the longitudinal mobility of the steering column tube defined by means of the adjusting device.

As a further development of the invention, the steering column tube has a profile section eccentrically offset to the outside, which is provided with a longitudinal slot aligned in the longitudinal direction of the steering column tube, and the longitudinal slot is penetrated by a bearing pin aligned radially to a longitudinal axis of the steering column tube and serving as the suspension point, which bearing pin is supported by means of a head area on the interior side at the profile section and which is held under spring tension on the vehicle-fixed console. The positioning of the bearing pin prestressed by spring force permits a play-free bearing of the steering column tube independently of the respectively adjusted swivelling position As a result of the integration of the suspension point in a profile section in one piece with the steering column tube, an extremely robust construction is achieved.

In a further development of the invention, the profile section is supported without play on opposite sides of the longitudinal slot by lateral supporting sections of the vehicle-fixed console in the transverse direction of the vehicle. As a result of the lateral support, an increased lateral stability is achieved, whereby lateral forces on the bearing pins are avoided.

As a further development of the invention, the supporting sections of the console are designed to be spherical relative to the profile section of the steering column tube. These round contours of the supporting sections adjoining the profile section of the steering column tube on the exterior side and the interior side ensure play-free kinematics in the case of corresponding adjusting movements.

As a further development of the invention, the vehicle-fixed console has a hollow chamber section for receiving the bearing pin, in which hollow chamber section the spring arrangement is positioned for the play-free support of the bearing pin. As a result, a secure protection of the suspension point is achieved against loads from the outside. In addition, the supporting sections are advantageously connected with the hollow chamber section.

In a further development of the invention, the steering-column-side and console-side sections which come in contact with one another in the area of the suspension point have a slide coating. This reduces the friction between the corresponding sections. Teflon coatings are advantageously provided.

Further advantages and characteristics of the invention are found in the claims as well as in the following description of preferred embodiments of the invention which are illustrated by means of the drawings.

Other objects, advantages and novel features of the present invention will become apparent from the following detailed description of the invention when considered in conjunction with the accompanying drawings.

BRIEF DESCRIPTION OF THE DRAWINGS

FIG. 1 is a schematic lateral view of an embodiment of a steering arrangement according to the invention;

FIG. 2 is an enlarged schematic representation of a forward suspension point of a steering column tube of the steering arrangement according to FIG. 1;

FIG. 3 is a cross-sectional, very detailed view of the embodiment of a steering arrangement of the invention according to FIG. 1 along the intersection Line III—III in FIG. 1.

DETAILED DESCRIPTION OF THE DRAWINGS

Figure 4:
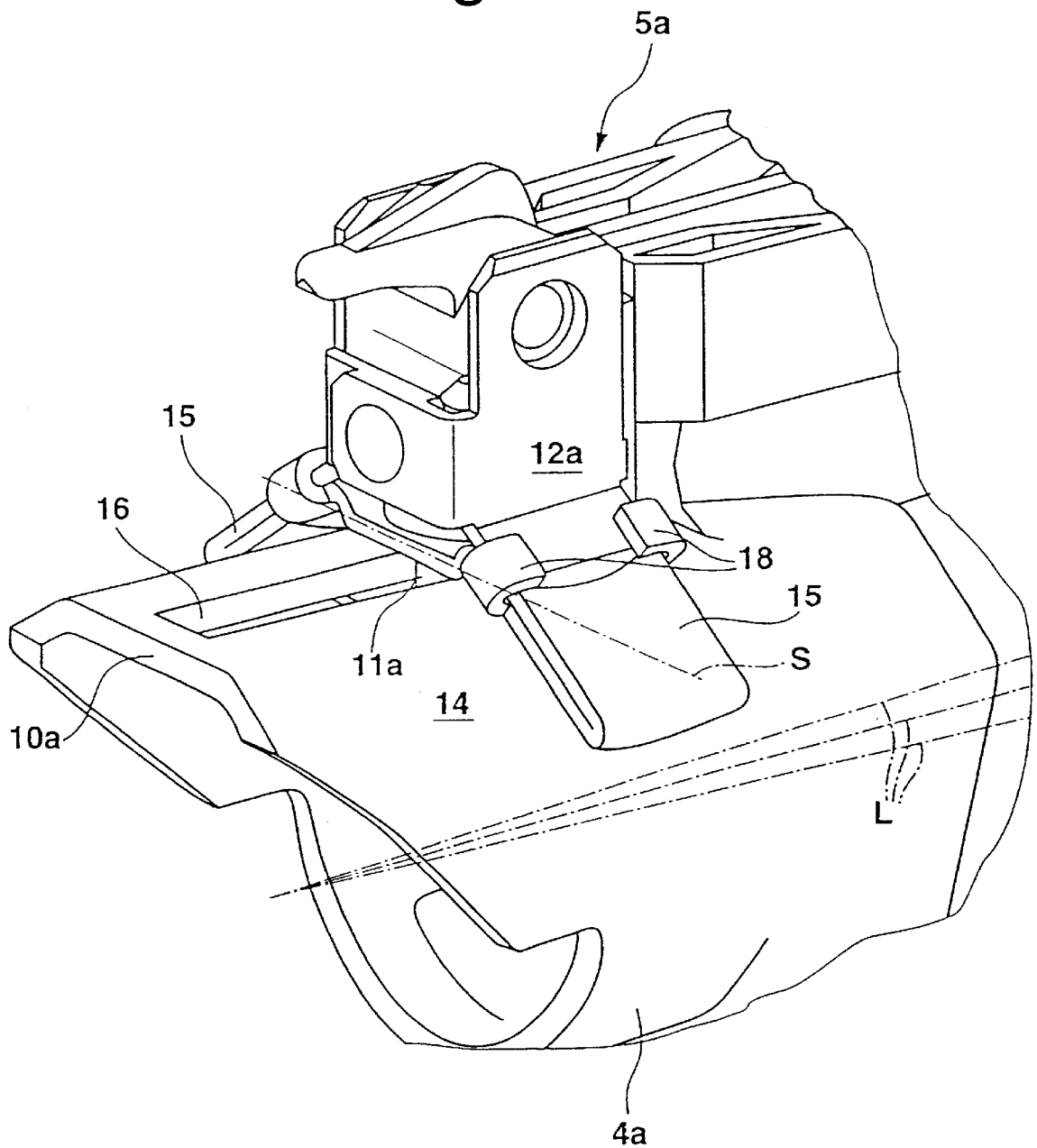
FIG. 4 is an enlarged three-dimensional view of the steering arrangement according to FIG. 3 in the area of the suspension point according to FIG. 3.

In a basically known manner, a steering system 1 for a passenger car according to FIGS. 1 and 2 has a steering wheel 2 situated in an interior of the motor vehicle, which steering wheel is held on a front-side end of a steering spindle 3. The steering spindle 3 is disposed in a rotationally movable manner in a steering column tube 4 which is held on a vehicle-fixed console 5. The vehicle-fixed console 5 is connected with corresponding parts of a vehicle body supporting structure in the area of a dashboard of the motor vehicle.

The upper steering spindle 3 is connected by way of a universal joint with a lower steering spindle 8 which, in turn, is coupled with a steering gear 9.

By means of an adjusting device 6, which can be operated manually, the steering column tube 4 can be longitudinally adjusted along its longitudinal axis L and can be adjusted in its height approximately at a right angle to the longitudinal axis L in each case with respect to the vehicle-fixed console 5. As a result, it is possible to adjust the position of the steering wheel 2 in its height as well as in its depth relative to the dashboard individually to the respective driver. On the rearward side and thus in a steering-wheel-side area, the steering column tube 4 is held on the vehicle-fixed console 5 by means of the adjusting device 6. On the forward side and thus in a forward, steering-gear-side area of the steering column tube 4, the steering column tube 4 is disposed by means of a single suspension point, on the one hand, swivellably about a swivelling axis S (FIG. 3) extending horizontally to the transverse direction of the vehicle, relative to the vehicle-side console 5. By means of this swivellable bearing, the adjustability of the height of the steering column tube 4 is achieved in the area of the adjusting device 6. On the other hand, the suspension point 7 is designed such that longitudinal displacements are possible along the longitudinal axis L of the steering column tube 4 while the steering column tube 4 does not leave the secure positioning at the suspension point 7. The suspension point 7 is applied to a profile section 10 of the steering column tube 4 arranged eccentrically with respect to the longitudinal axis L of the steering column tube 4. The profile section 10 is positioned above the steering spindle 3 as a corresponding extension of the steering column tube 4 and thus offset closer to the vehicle-fixed console 5.

In a manner not shown in detail analogous to the embodiment of FIGS. 3 and 4, a longitudinal slot extends parallel to the longitudinal axis L into the profile section 10, a bearing pin 11 as part of the suspension point 7 projecting through the longitudinal slot. On the interior side of the profile section 10 and thus on the side of the profile section 10 facing the steering spindle 3, the bearing pin 11 has a head area which is not marked in detail and which is supported on the interior side of the profile section 10. On the opposite exterior side of the profile section 10, the bearing pin is connected with a spring arrangement 13 which is suspended or supported on the vehicle-fixed console 5. The spring arrangement exercises a tension force on the bearing pin 11 which—relative to the longitudinal axis L—acts radially toward the outside, by which tension force the head area of the bearing pin 11 is pressed against the interior side of the profile section 10. In addition, the vehicle-fixed console 5 has supporting sections 12 as abutments which support the exterior side of the profile section 10 against the tension force caused by the bearing pin 11, so that the profile section 10 of the steering column tube 4 is held without play between the head area of the bearing pin 11 and the supporting sections 12 of the vehicle-fixed console 5.

The head area of the bearing pin 11 as well as the corresponding supporting sections 12 of the vehicle-fixed console 5 are spherically designed relative to the swivelling axis S in order to achieve a kinematically perfect, play-free swivelling of the profile section 10 and thus of the steering column tube 4 in the area of the suspension point 7 (indicated by broken lines). A circular arc of a connecting link guide of the vehicle-fixed console 5 in the area of the adjusting device 6, which connecting link guide is responsible for the adjustment of the height, is aligned coaxially with respect to the swivelling axis S.

The practical implementation of the steering arrangement 1 according to FIGS. 1 and 2 illustrated in FIGS. 3 and 4 corresponds to the above-described operating principle of the steering arrangement 1 according to FIGS. 1 and 2, the components or sections having the same function being provided with the same reference numbers with the addition of the letter a. The steering column tube 4a has a cross-section which is polygonal in the upper area, in which case, on the one hand, the horizontal profile section having the longitudinal slot 16 is formed in the area of the suspension point 7. On the other hand, the profile section 10a of the steering column tube 4a is bounded by diagonally sloping-down side flanks 14 which are each designed as respective angularly applied plane profile sections. The vehicle-fixed console 5a has two corresponding roof-type supporting sections 15 which rest against the side flanks 14 on the exterior side. In addition, in the area of the suspension point 7, the console 5a has a sliding block 12a provided with a central hollow-chamber section, to which sliding block 12a the roof-type supporting sections 15 are molded in one piece. By way of a cross-bore 17, the sliding block 12a is fastened by means of a corresponding stud connection in a detachable manner to the vehicle-fixed console. The bearing pin 11a has a head area which supports the interior side of the steering column tube 4a and of the profile section 10a, which head area, analogous to the illustration of FIG. 2, has a spherical design relative to the swivelling axis S. Within the sliding block 12a, the bearing pin 11a is spring-loaded by a disk spring 13a used as the spring arrangement which is supported at a bottom of the sliding block 12a. In an embodiment which is not shown, a rubber block or pin is provided instead of a disk spring, which rubber block or pin takes over the spring-elastic support of the bearing pin. In addition to the head area of the bearing pin 11a, the undersides of the roof-type supporting sections 15 also have a spherical design, which is illustrated by means of FIG. 4. The function corresponds to the function of the supporting sections 12 according to FIG. 2. The steering column tube 4a can therefore be swivelled about the swivelling axis S such that the longitudinal axis L according to FIG. 4 (dash-dotted representation) can take up different positions relative to the vehicle-fixed console 5a. The longitudinal slot 16 ensures the longitudinal displaceability of the steering column tube 4a. In order to ensure, on the basis of the permanent play-free contact of the bearing pin 11a and of the supporting sections 15 on the steering column tube 4a nevertheless a low-friction longitudinal displaceability of the steering column tube 4a, the undersides of the supporting sections 15 as well as the top side of the head area of the bearing pin 11a are slide-coated, preferably TEFLON-coated (i.e. fluoroplastic). The slide-coated zones have the reference number B.

As illustrated by means of FIGS. 3 and 4, the sliding block 12a in the area of the supporting sections 15 is designed as a plate bending construction. In the area of the supporting sections 15, the plate lugs forming the supporting sections 15 have a double construction. In this case, one one-piece plate lug is correspondingly folded back, so that, on the whole, a straddling cross-section is obtained (FIG. 3). In the event of a crash, the selected plate bending construction ensures a catch function for the steering column tube 4a in that a corresponding crash load according to FIG. 3 onto the steering column tube 4a in the downward direction by way of the bearing pin 11 takes along the bottom of the sliding block 12a, whereby the lug areas of the supporting sections 15 are bent open downward. As a result of the plastic deformation of the supporting sections 15 and the folding-open of the lug areas of the supporting sections 15, an energy absorption takes place, in which case the entire bending plate construction of the sliding block 12a lengthens in the downward direction. As a result of the lengthening, the steering column tube 4a remains caught in the area of this suspension point. However, simultaneously, the impact energy was destroyed by the deformation of the supporting sections 15 and of the bottom of the sliding block 12a. As illustrated in FIG. 4, the lug areas of the supporting sections 15, which have a double construction because of the bending and folding-over, are additionally secured by bending lugs 18 which correspondingly reach over on the outside, in order to prevent that already lower forces in the vertical direction of the vehicle cause a widening of the supporting sections 15. As the result of these bending lugs 18 used for securing purposes, it is ensured that the desired widening and lengthening of the sliding block 12a in the downward direction takes place only at load levels which correspond to corresponding crash loads.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Steering arrangement for a motor vehicle having a steering column tube which is arranged in a steering-wheel-side area and has an adjusting device for a height adjustment of a steering wheel relative to a vehicle-fixed console and which, in a steering-gear-side area, is swivellably disposed on the vehicle-fixed console by means of a compensating bearing, wherein the steering column tube is additionally held in an adjustable manner for movement along a longitudinal axis of the steering column tube by the adjusting device, and wherein the compensating bearing is formed by a single suspension point which is eccentrically arranged with respect to the steering column tube and which defines a swivelling axis for the height adjustment of the steering column tube, and which provides displaceability of the steering column tube along the longitudinal direction of the steering column tube.

2. Steering arrangement according to claim 1, wherein the steering column tube has a profile section which is eccentrically displaced to the outside and which is provided with a longitudinal slot aligned in the longitudinal direction of the steering column tube, and wherein the longitudinal slot is penetrated by a bearing pin aligned radially to a longitudinal axis of the steering column tube and used as a suspension point, which bearing pin is supported by a head area on the interior side on the profile section and which is held under spring tension on the vehicle-fixed console.

3. Steering arrangement according to claim 2, wherein a sliding block of the console has a hollow-chamber section for accommodating the bearing pin, in which hollow-chamber section the spring arrangement is positioned for the play-free support of the bearing pin.

4. Steering arrangement according to claim 2, wherein portions of the bearing pin and the interior side of the profile section, which come in contact with one another in the area of the suspension point, are coated with a friction resistant coating.

5. Steering arrangement according to claim 2, wherein the profile section is supported without play on opposite sides of the longitudinal slot by lateral supporting sections of the vehicle-fixed console in the vehicle direction.

6. Steering arrangement according to claim 5, wherein the supporting sections have a roof-type design and reach over two correspondingly diagonally down-sloping lateral flanks of the profile section.

7. Steering arrangement according to claim 6, wherein the supporting sections are part of a counterpart which is detachably fastened on the console.

8. Steering arrangement according to claim 7, wherein the counterpart is designed as a plate bending construction such that a plastically deformable flexibility exists downward in the vertical direction of the vehicle.

9. Steering arrangement according to claim 5, wherein the supporting sections of the console and the head area of the bearing pin have a spherical design relative to the profile section of the steering column tube.

10. Steering arrangement according to claim 5, wherein the supporting sections are part of a counterpart which is detachably fastened on the console.

11. Steering arrangement according to claim 10, wherein the counterpart is designed as a plate bending construction such that a plastically deformable flexibility exists downward in the vertical direction of the vehicle.

12. Vehicle steering assembly comprising:

a steering wheel, a steering column tube supporting the steering wheel, a longitudinal adjusting mechanism accommodating longitudinal adjustment of the steering column tube with respect to fixed vehicle body structure, and a compensating bearing swivellably supporting the steering column tube and allowing longitudinal adjustment of the steering column tube with respect to the fixed body structure, said compensating bearing having a single suspension point disposed eccentrically with respect to a longitudinal axis of the steering tube and defining a swivel axis for the adjusting device.

13. Vehicle steering assembly according to claim 12, wherein the steering column tube has a profile section which is eccentrically displaced to the outside and which is provided with a longitudinal slot aligned in the longitudinal direction of the steering column tube, and wherein the longitudinal slot is penetrated by a bearing pin aligned radially to a longitudinal axis of the steering column tube and used as a suspension point, which bearing pin is supported by a head area on the interior side on the profile section and which is held under spring tension on the vehicle-fixed console.

14. vehicle steering assembly according to claim 13, wherein the profile section is supported without play on opposite sides of the longitudinal slot by lateral supporting sections of the vehicle-fixed console in the vehicle direction.

* * * * *